Oct. 11, 1932.  F. M. INGRAM  1,882,619
CALF MUZZLE
Filed Aug. 24, 1931
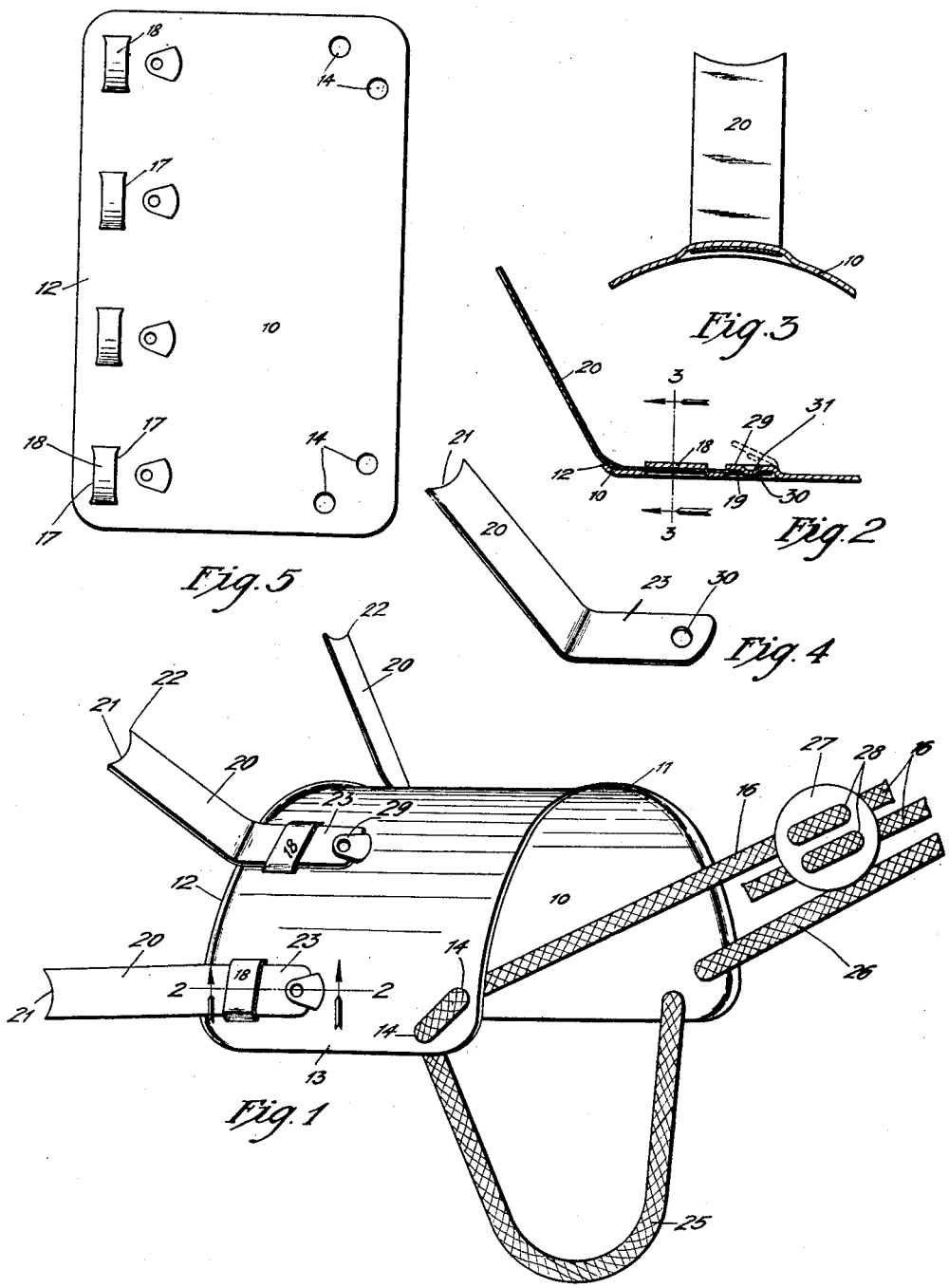
Inventor
Floyd M. Ingram
by Orwig & Hague Attys.

Patented Oct. 11, 1932

1,882,619

UNITED STATES PATENT OFFICE

FLOYD M. INGRAM, OF SIOUX RAPIDS, IOWA

CALF MUZZLE

Application filed August 24, 1931. Serial No. 559,014.

This invention relates to improvements in calf muzzles of that type employing a curved body portion, and having at one end a series of outwardly and forwardly extending tines or prongs.

In muzzles of this type which have heretofore been in common use the tines or prongs and the body portion are usually formed of a single piece of metal, or the tines are formed of separate pieces of metal rigidly connected to the body portion and comparatively stiff. There is considerable objection to providing muzzles of this type with prongs which are stiff, due to the fact that the prongs are injurious to the mother and to other animals. Furthermore, if the tines are formed of nonresilient material, they often become bent and do not function properly.

It is therefore the object of my invention to provide a calf muzzle of simple, durable and inexpensive construction having a comparatively stiff body portion and tine members formed of comparatively thin and resilient metal, so arranged that the tines may be easily bent from a normal position and at the same time assume their natural position after the bending force has been removed.

A further object of my invention is to provide a calf muzzle which is capable of being manufactured in such form as may be shipped in a knocked-down and compact condition, whereby the muzzle may be shipped in comparatively small containers if so desired, and whereby the muzzle will occupy a comparatively small space when being stored.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a perspective view of my improved muzzle.

Figure 2 is a detail sectional view taken on the line 2—2 of Figure 1.

Figure 3 is a detail sectional view taken on the line 3—3 of Figure 2.

Figure 4 is a perspective view of one of the tines employed in my improved muzzle.

Figure 5 is a plan view of the body portion before the tines have been attached and in the condition in which it is shipped.

Referring to the accompanying drawing I have used the reference numeral 10 to indicate the body portion of my improved muzzle, which is preferably formed of a substantially rectangular piece of sheet metal, and comparatively non-resilient.

The body comprises a back edge 11 and a front edge 12 and side edges 13. The corners of said side edges and the back edge are provided with a pair of openings 14. The openings 14 are designed to receive a rope 16 which supports the muzzle in position on the animal's head.

The rope 16 is threaded through the pairs of openings 14 in a manner clearly illustrated, to form the rope into loop portions 25 and 26, the loop 25 being designed to pass under the animal's jaws and the loop 26 being designed to be supported by the animal's head. The free ends of the loops are secured together by a clamp device 27, comprising a disk shaped clamp having an opening 28 through which the ends of the ropes are threaded, in the manner clearly illustrated in Figure 1. The rope 16 is adjustably mounted in the clamp to increase or decrease the size of the loop 26, and also adjustable in the openings 14 to increase or decrease the size of the loop 25.

Near the front edge 12 of the body I have provided slots 17 arranged in pairs to provide what I shall term an anchor strap 18 between the slots, said anchor straps being bent outwardly in the manner clearly illustrated in Figure 4. In front of each pair of slots 17 I have provided a slot 19. The front edge of the slot 19 is bent upwardly as illustrated in Figure 2 to form a lug 29. The anchor straps 18 and the lugs 29 provide means for securing the tines 20 in position.

Each of the tines 20 is formed preferably of a comparatively thin piece of metal formed of spring steel. The outer end of each of the tines is provided with a curved notch 21 to form pointed ends 22. The opposite end of each of the tines 20 is provided with an extended portion 23.

The portion 23 is provided with an opening 30 for receiving an inwardly extending portion 31 of the lug 29, so that when the portion 23 of the tine 20 is placed beneath the member 18, the extreme end of the portion 23 will enter beneath the lug 29, which is then bent downwardly until the portion 31 enters the opening 30. The members 29 are bent to a slightly elevated position, as shown by dotted lines in Figure 2, when the body portion is formed. The inner ends of the lugs 29 are slightly curved in the manner illustrated in Figure 5 to somewhat strengthen them.

The tines are formed separately from the body 10 and packed together against the said body, so that the tines and the body may be packed in a suitable container for shipment. After the package has been received by the customer, the tines are placed in position beneath the members 18 in the manner before described.

After this has been accomplished, the body 10 is then bent or curved into a substantially semi-cylindrical form, as shown in Figure 1, the amount of the curvature depending upon the size of the animal's head, after which the rope 16 may be placed in position. The straps 18 are forced outwardly sufficiently to permit the tines to be easily placed in position, and for that reason would fit somewhat loosely.

However, when the body portion is curved to its final position, the curving of the body portion tends to draw the straps inwardly and also tends to bend the tines so that the straps and the tines assume the position illustrated in Figure 3.

Thus it will be seen that means is provided whereby the tines are quite rigidly fixed to the body without the use of rivets, screws or other fastening devices, ercept the strap 18 and the lug 19.

Thus it will be seen that I have provided a calf muzzle of very simple construction which is capable of being packed in a comparatively small space for shipment and storage, and which is at the same time capable of being easily and quickly assembled for use, and which is also capable of being adjusted to fit animals of different sizes, and thereby eliminate the necessity of carrying several sizes in stock, and when so constructed provides a muzzle having resilient tines which are free to bend in case the tines engage an obstruction, and to return to their normal position after the pressure has been released without injury to the tine.

Furthermore, the tine is made of very thin material so that it will not injure the calf's mother or other animals as it engages the animal's body, and at the same time it is effective for the purpose intended.

The recess formed in the end of the tine is of slight depth to form comparatively short points, so that the only injury that could be inflicted to an animal would be a slight scratch.

I claim as my invention:

1. A calf muzzle comprising a substantially rectangular plate having front and back edges, rope receiving openings in each corner of its back edge, a series of anchor straps adjacent to the front edge of the outer surface of said body, a slot opposite each anchor strap to form an upwardly bent lug, a tine for each anchor strap formed of thin resilient metal, one end of said tine having a curved notch to form points and the other end having a bent portion having an opening, said bent portion being adapted to be placed beneath said anchor strap and beneath said lug with the downwardly extending parts of said lug extended into said opening, and an adjustable rope for the first said openings.

2. A calf muzzle in the flat comprising a body portion formed of a flat piece of quite stiff and comparatively non-resilient metal capable of being bent to a substantially semi-cylindrical formation, a series of tines formed of comparatively thin and highly resilient metal, one end of each of said tines having a pointed portion, and means for detachably anchoring the opposite end of each of said tines to one end of said body portion with the tines projecting outwardly and forwardly of one end of said body portion.

3. A calf muzzle comprising a curved body portion formed of stiff material, a series of tines formed of thin and flat spring steel, means for detachably supporting one end of each of said tines to one edge of said body, and means for supporting said body on an animal's head.

4. A calf muzzle comprising a curved body portion formed of stiff material, a series of tines formed of thin and flat spring steel, the outer end of each of said tines having a shallow notch to form blunt points, and means for detachably supporting the opposite end of each of said tines to one edge of said body.

Des Moines, Iowa, July 29, 1931.

FLOYD M. INGRAM.